United States Patent
Browne et al.

(10) Patent No.: US 8,427,429 B2
(45) Date of Patent: Apr. 23, 2013

(54) ACTIVE INTERFACE CONTROLS HAVING BI-STABLE ACTUATION AND INTRINSIC SENSING CAPABILITY

(75) Inventors: Alan L. Browne, Grosse Pointe, MI (US); Nancy L. Johnson, Northville, MI (US); Andrew C. Keefe, Encino, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 12/785,264

(22) Filed: May 21, 2010

(65) Prior Publication Data

US 2011/0285618 A1 Nov. 24, 2011

(51) Int. Cl.
*G06F 3/02* (2006.01)

(52) U.S. Cl.
USPC .......................................... 345/168; 434/113

(58) Field of Classification Search .................. 345/690, 345/55, 87, 156–184; 257/414–420, 467–470; 340/995.1–995.28; 434/113–115
See application file for complete search history.

(56) References Cited

U.S. PATENT DOCUMENTS

| | | | |
|---|---|---|---|
| 6,354,839 B1* | 3/2002 | Schmidt et al. | 434/113 |
| 7,411,331 B2 | 8/2008 | Dubowsky et al. | |
| 7,690,621 B2* | 4/2010 | Grummon | 251/11 |
| 2004/0197519 A1* | 10/2004 | Elzey et al. | 428/68 |
| 2007/0247420 A1 | 10/2007 | Strohband et al. | |
| 2008/0075930 A1* | 3/2008 | Kornbluh et al. | 428/189 |
| 2008/0303796 A1* | 12/2008 | Fyke | 345/173 |
| 2009/0015560 A1* | 1/2009 | Robinson et al. | 345/168 |
| 2009/0041085 A1* | 2/2009 | Petrakis | 374/187 |
| 2009/0047197 A1* | 2/2009 | Browne et al. | 422/307 |
| 2011/0098094 A1* | 4/2011 | Forsell et al. | 463/8 |

* cited by examiner

*Primary Examiner* — Liliana Cerullo (57) ABSTRACT

An active interface control shiftable between deployed and stowed configurations, and including an active material actuator employing a bi-stable mechanism configured to increase the actuator stroke length, and/or presenting intrinsic or external sensing capability, and reconfigurable displays comprising separately shiftable sets of controls.

20 Claims, 3 Drawing Sheets

ACTIVE INTERFACE CONTROLS HAVING BI-STABLE ACTUATION AND INTRINSIC SENSING CAPABILITY

BACKGROUND OF THE INVENTION

1. Technical Field

This disclosure generally relates to autonomously deployable human interface controls (e.g., push buttons, knobs, dials, switches, handles, etc.), and more particularly, to selectively deployed and stowed interface controls comprising an active material actuator, and further comprising an active material actuator utilizing a bi-stable structure for added stroke length, and/or an active material actuator having intrinsic sensing capability.

2. Background Art

Mechanically deployed and stowed interface controls, such as push buttons, have been developed to provide a more facilely and ergonomically engaged component when manipulation is desired, and a more visually pleasing (e.g., concealed) presentment when not in use. Conventional methods of shifting controls include manual and mechanical drives, electrical motors, and generating fluid pressure differentials adjacent the structure using vacuums, pumps, and controlled valves. Concernedly, however, these methods often require extraneous labor, inefficient energy input, additional moving parts, complex peripheral sub-systems, and the increased packaging requirements associated therewith.

Active material actuators have been developed for a variety of autonomous functions, but typically present an available stroke directly limited by the active material element. Mechanically advantageous transmissions and other measures have been used to magnify either the force or displacement produced by the element; however, they typically require external mechanical components to create leverage, hold their positions, reset, and protect the actuator wire from excessive loads.

BRIEF SUMMARY

The instant invention presents a selectively deployed and stowed interface control having an active material actuator comprising a bi-stable component, and/or presenting intrinsic sensing capability. More particularly, in the first aspect, the actuator includes a facilely shiftable bi-stable mechanism that provides an out-of-plane actuator stroke length substantially greater than the displacement directly produced by the active material element. As such, the actuator offers zero-power hold in both positions. The invention is useful for reducing the number of additional parts, complexity, and packaging requirements in comparison to prior art mechanically advantageous transmissions, and therefore, provides an active material actuator having improved device work per unit volume.

The usage of active material elements reduces weight and/or complexity in comparison to counterpart mechanical, electro-mechanical, hydraulic, or pneumatic based systems. Moreover, it is appreciated that active material usage increases energy efficiency, and reduces the likelihood of failure and costs associated therewith. Where a plurality of controls is presented, the invention is yet further useful for providing a reconfigurable display. Finally, in the second aspect, the invention is useful for providing intrinsic (i.e., without the addition of an extraneous sensory component) determination of a relevant or triggering condition, such as an applied pressure.

Thus, the first aspect of the invention concerns an active interface control selectively shiftable between, and presenting a selected one of first and second stable configurations. The control comprises a manipulable component, and an active material actuator. The actuator further comprises at least one active material element operable to undergo a reversible change in functional dimension when exposed to or occluded from an activation signal. The element is drivenly coupled to the component, such that the change causes the component to displace and the control to shift to the other of said configurations. The inventive actuator further comprises a bi-stable mechanism intermediately coupled to the component and element. The mechanism is drivenly coupled to the element, and operable to magnify the displacement of the component, so as to result in an actuator stroke length greater than the change in dimension.

In the second aspect of the invention, an active interface control includes an active material actuator, and controller communicatively coupled to, and configured to receive an input from the active material element. The element and controller are cooperatively configured to intrinsically determine a triggering condition based on the input.

Other aspects and advantages of the present invention, including the employment of shape memory alloy wires and other active materials for actuating, arrays of controls and reconfigurable displays, and preferred methods of sensing external pressure will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein.

DETAILED DESCRIPTION

The following description and illustrated embodiments of the invention are merely exemplary in nature and in no way intended to limit the disclosure, its application, or uses. Though described and illustrated with respect to automotive application; it is certainly within the ambit of the invention to use the benefits and features presented herein, in other settings, such as in regards to portable, residential, aviation, or commercial building system controls. The term "interface control" shall be deemed to include active push buttons (FIGS. 1-4), knobs, switches, and other tactile human-machine interfaces, as well as structures that enable/facilitate manual control of an object, such as door handles, garment hooks, and latches.

I. Discussion of Exemplary Active Material Function and Constitution

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials, such as shape memory alloys (SMA), ceramics, and polymers, ferromagnetic SMA's, thin strips of piezoelectric uni- and bimorphs, magnetorheological (MR) and electrorheological (ER) compositions, and electroactive polymer (EAP) diaphragms/tendons/roll actuators/etc. It is appreciated that SMA wires and EAP tendons are especially suited for use in the present invention. Shape memory materials generally refer to materials or compositions that have the ability to remember their original shape, which can subsequently be recalled by applying an external stimulus. As such, deformation from the original shape is a temporary condition. In this manner, shape memory materials can change to the trained shape in response to an activation signal.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control of shape with continuous power supplied. External magnetic fields are generally produced via soft-magnetic core electromagnets in automotive applications, though a pair of Helmholtz coils may also be used for fast response.

Suitable piezoelectric materials for use in the present invention include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly (methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. One example, a dielectric elastomer, is an electrostrictive-grafted elastomer with a piezoelectric poly(vinylidene fluoride-trifluoro-ethylene) copolymer. This combination has the ability to produce a varied amount of ferroelectric-electrostrictive, molecular composite systems, and may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

An electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, the electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Suitable materials used in the composition of electrodes may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Active Interface Controls, Applications, and Uses

The present invention concerns a reconfigurable interface control 10 that utilizes active material actuation to modify its geometric configuration, and positioning to achieve a selected one of plural stable configurations. For example, the control 10 may be configured to achieve stowed and deployed configurations as shown in the illustrated embodiment, wherein manipulation by a user (not shown) is facilitated in the deployed configuration, while the control 10 is in a more recessed state in the stowed configuration. More preferably, the control 10 is only visible in the deployed configuration.

Figure 1:
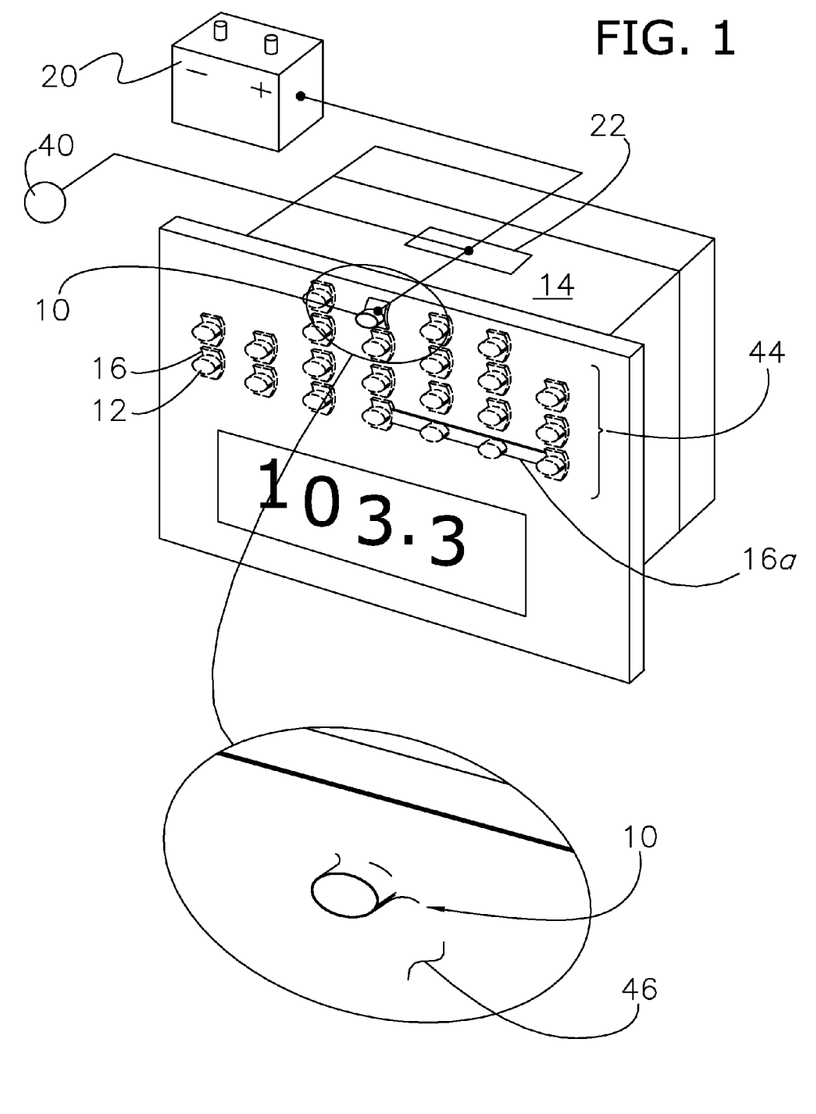
FIG. 1 is a perspective view of a plurality of human-machine interface controls (e.g., push button presets) presenting a display, wherein each control comprises a bi-stable actuator, and manipulable component, and is communicatively coupled to an entertainment system controller/signal source, in accordance with a preferred embodiment of the invention.
Figure 2:
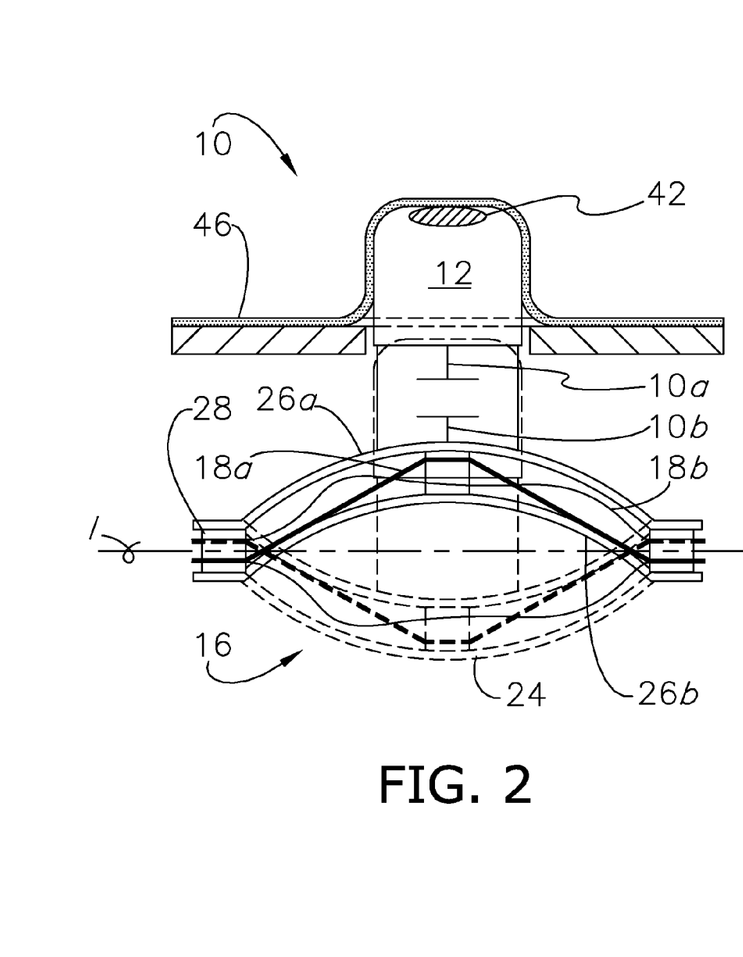
FIG. 2 is an elevation of a membrane, push button interface control, and bi-stable actuator comprising first and second rigid bent members, shape memory alloy wires or EAP tendons, and a piezoelectric element, in accordance with a preferred embodiment of the invention.

The control 10 contains a manipulable component 12, such as the push button, or HMI (human-mechanism interface) shown in the illustrated embodiment, wherein manual manipulation of the component 12 causes input to be received by an associated system 14. For example, the control 10 may be a rotatable knob that presents the volume control or a push button that presents the On/Off switch of an entertainment system 14 (FIG. 1). As shown in FIG. 2, the button, when deployed, may be selectively caused to engage contacts 10a, b, which when closed completes a circuit. It is appreciated that deployment does not affect the function of the control 10.

Figure 2A:
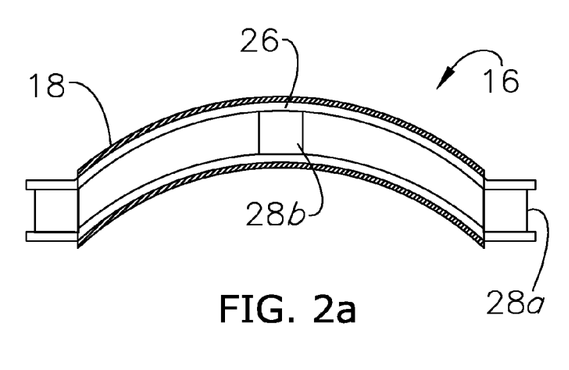
FIG. 2a is an elevation of an alternative actuator employing active material patches superjacent the bent members of FIG. 2, in accordance with a preferred embodiment of the invention.
Figure 2B:
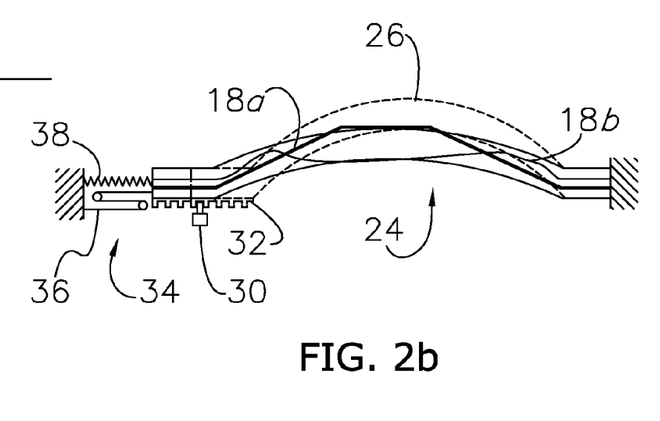
FIG. 2b is an elevation of an alternative bi-stable actuator including a single rigid member having an adjustable end point, and a manipulating auxiliary actuator drivenly coupled to the member, in accordance with a preferred embodiment of the invention.
Figure 3:
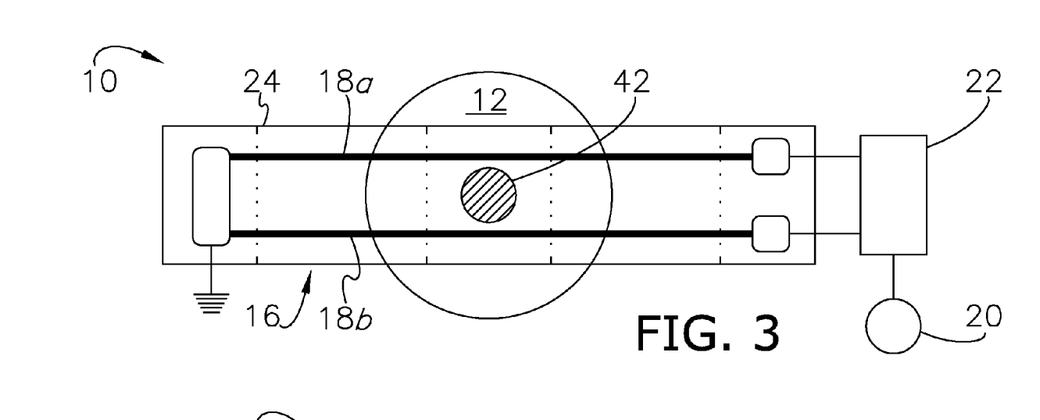
FIG. 3 is an exemplary plan view of the control and actuator shown in FIG. 2.
Figure 4:
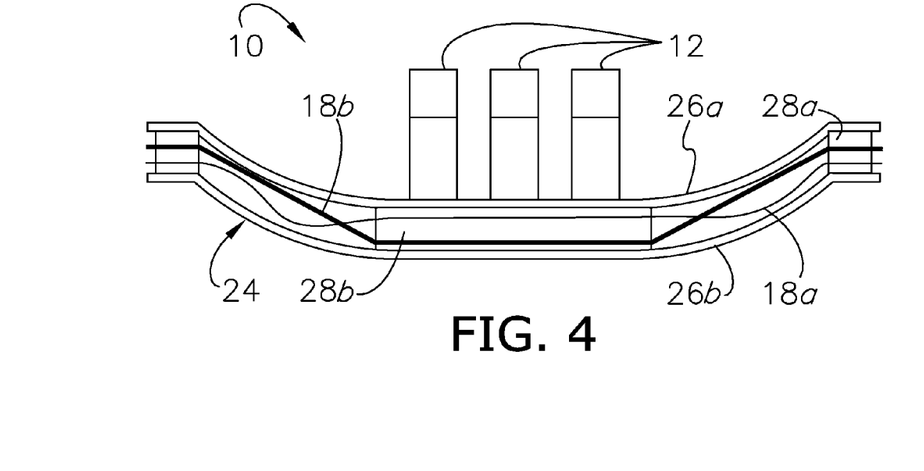
FIG. 4 is an elevation of a plurality of push button interface controls drivenly coupled to a common bi-stable actuator comprising first and second rigid bent members, and shape memory alloy wires or EAP tendons, in accordance with a preferred embodiment of the invention.

More particularly, and as shown in FIGS. 2-4, each control 10 includes or is drivenly coupled to an actuator 16 having at least one active material element 18 that is operable to cause reconfiguration, when activated and/or deactivated. That is to say, the element 18 is comprised of an active material operable to undergo a reversible change in fundamental property when exposed to or occluded from an activation signal, as described above. In the present invention, the fundamental property change causes the element 18 to undergo a change in dimension. Where SMA wire 18 (FIGS. 2, 4) is utilized, for example, it is appreciated that activation results in a longitudinal contraction of approximately four percent.

The element 18 is, therefore, communicatively coupled to a source 20 (FIG. 1) operable to generate the activation signal in such a manner that the element 18 is selectively caused to be exposed to the signal. In an automotive setting, for example, the source 20 may be the power supply (i.e., the charging system and battery) of the vehicle, and a thermal activation signal may be selectively produced by passing a current through the resistance of the element 18, so as to result in Joule heating. In a preferred embodiment, a controller 22 (FIGS. 1, 3) is intermediately coupled to the source 20 and element 18, and programmably configured to control exposure to the signal by the element 18, so as to effect complete shifting of the control 10 from one configuration to the other, without causing overheating or overloading. For example, the controller 22 may include a timer, so that activation and deployment of the control 10 results for a predetermined period (e.g., 10 seconds) before initiating stowage.

In a preferred embodiment of the invention, the actuator 16 is configured such that the control 10 is caused to achieve a permanent second configuration that is maintained even when the signal is terminated, and as such, preferably contains a bi-stable mechanism 24. That is to say, the preferred actuator 16 provides zero-power hold in both configurations (e.g., stowed and deployed), so as to eliminate the need for a constant signal to maintain the reconfiguration. The structurally bi-stable mechanism 24 comprises structure operable to present one of two permanent or "stable" geometric configurations. In the present invention, shifting the structure to the other of the two configurations effects further action, including displacing the component 12.

The element 18 preferably presents "two-way" action, wherein toggling the mechanism 24 between the first and second stable configurations is performed by subsequent activations. The bi-stable mechanism 24 is preferably configured to magnify the displacement of the component 12, so as to result in an actuator stroke length greater, more preferably, fifty-percent greater, and most preferably, one-hundred percent greater than the change in dimension experienced by the element 18 (e.g., the change in wire length). Finally, it is appreciated that fewer or greater actuators 16 may be employed to concurrently displace one or more components 12 through, for example, a long strip 16a (FIG. 1) or rocker button.

An exemplary bi-stable mechanism 24 is best shown in FIG. 2 and includes at least one rigidly bent member 26 secured at or near its distal ends to fixed structure (not shown), such as the instrumental panel of a vehicle. The member 26 acts as a biasing spring able to swing between concavely (shown in hidden line type in FIG. 2) and convexly bowed profiles. That is to say, once the member 26 is caused to "snap through" a center-line of flexure, l, defined longitudinally by the bowed profiles, it comes to a point of rest in the new configuration. In this configuration, it is appreciated that the instant mechanism 24 provides a low-profile planar design, negative stiffness region, and large mechanical advantage.

As shown in FIG. 2b, the mechanism 24 may include a single rigid member 26. More preferably, however, the mechanism 24 comprises two parallel members 26a, b (FIGS. 2-4), so as to increase stability and resistance to torsion. Here, the members 26a,b are spaced and interconnected by a plurality of spacers 28. In the illustrated embodiment, first and second distal spacers 28a engage the members 26a,b at or near their ends, and a floating spacer 28b engages the members 26a,b generally at their longitudinal midline. The spacers 26 may be of any suitable width, thickness, length, or composition, and may differ accordingly.

The distal spacers 28a are generally fixed as shown in FIGS. 2 and 2a. However, it is also within the ambit of the present invention to include at least one adjustable end point as shown in FIG. 2b. In this configuration, the mechanism 24 is operable to achieve one of plural permanent lateral positions. For example, a releasable latch 30 may be configured to selectively engage a toothed bar 32 attached to the member 26 in one of a plurality of positions defined by the teeth. The member 26, and, therefore, bar 32 are drivenly coupled to an auxiliary actuator 34. In FIG. 2b, the actuator 34 includes an auxiliary SMA wire 36 (and pulley system) configured to pull the end point and flatten the member profile when activated, and a biasing spring 38 configured to push the end point back towards the longitudinal midline of the member 26 when the auxiliary wire 36 is deactivated. The actuator 34 is configured to pull or push the end point of the member 26, so that the member 26 is caused to achieve a lesser or more bowed configuration, respectively. In the more bowed configuration, it is appreciated that the member 26 will present more resistance to manipulation and toggling, and as such, require a greater actuating force from the element 18.

In the illustrated embodiment the element 18 comprises first and second mechanically independent SMA wires (or EAP tendons) 18a,b, which are non-antagonistically coupled to the bi-stable mechanism 24 (FIGS. 2-4). That is to say, the activation force applied by one wire does not work to impose a load upon or cause strain in the other, thereby minimizing the parasitic (non-productive) work the actuator material must do; i.e., all active material work goes to the desired function. The wires 18a,b are dedicated to stowing and deployment, respectively. It is appreciated that multiple wires may be used in lieu of a single wire on either the stow, deploy, or both sides of the actuation, whereas multiple wires of smaller diameter would increase the frequency response of the actuator 16 due to faster cooling, while providing the same working stress and strain. In a preferred embodiment, the wires 18a,b present differing transition temperatures, so as to be passively stowed or deployed, when ambient temperature exceeds the lower (e.g., in a fire, etc.).

As shown in FIGS. 2-4, the preferred wires 18a,b are distally connected to the distal spacers 28a, which also serve as the electrical and/or mechanical contacts therefore, and intermediately threaded through and/or connected to the floating spacer 28b. The first wire 18a engages the floating spacer 28b closer to the center-line of flexure than does the second wire 18b when the control 10 is in the stowed configuration (FIG. 4). The wires 18a,b are cooperatively configured such that the first wire 18a is taut and the second wire 18b is slack when the members 26a,b are in the deployed configuration (FIG. 2), and the first wire 18a is slack and the second wire 18b is taut when the members 26a,b are in the stowed configuration. The first wire 18a preferably engages the distal spacers 28a below the second wire 18b as shown in FIGS. 2-4.

The wires 18a,b and members 26a, b are cooperatively configured to effect ideal load distribution and performance during reconfiguration. For example, it is appreciated that each of the shape memory wires 18a,b preferably presents a wire diameter that correlates with the stiffness (k) presented by the respective member 26a, b along the vertical axis. Moreover, and as previously mentioned, the mechanism 24 presents a negative stiffness region that allows the stress experienced by the activating wire to remain generally constant.

In an alternative embodiment, the element 18 may present piezoelectric ceramic or polymer based bi-morph or two such uni-morphs as flexible actuation patches directly upon the members 26a,b (FIG. 2a). Here, activation caused the patch to flatten, thereby producing the force necessary to shift the mechanism 24.

In another aspect of the invention, the preferred control 10 is operable to detect a triggering or otherwise relevant condition, and as such presents intrinsic sensing capability (i.e., without the use of an external sensor). In the illustrated embodiment, for example, the element 18, through communication with the controller 22, is further configured to determine when a pressure is applied to the component 12. For example, where SMA wires 18a,b are employed, it is appreciated that a minimal sensing current could be maintained in the taut wire 18a when the control 10 is deployed. The current is continually monitored by the controller 22 to determine the resistance through the wire 18a, whereas it is appreciated that an applied pressure will modify the measured resistance. When a pressure greater than a minimum threshold is determined preferably over a period greater than a minimum period, indicating a true button press, a full current is passed through the wire 18a, so as to effect stowage. Thus, the preferred controller 22 is configured to selectively cause activation or deactivation only when a condition is determined.

Alternatively, it is appreciated that where dielectric elastomer or piezoelectric actuator patches are employed, they can also function as intrinsic sensors, wherein the former transduces mechanical deformation through change in capacitance, and the latter transduces mechanical pressure directly as voltage.

It is appreciated that input through an external sensor 40 (FIG. 1) may also be used to determine a related or triggering condition. For example, air pressure can be monitored with a gauge to indicate when a window or door is opened, or the like, so that the controller 22 deploys the HVAC "On/Off" control 10. Door locks and handles may also be deployed, when the ignition of the vehicle is turned "On", or the gear shift is positioned in and out of park. Other sensor inputs such as thermometer measurements indicating an interior cabin temperature exceeding a pre-set temperature threshold, and the like can be employed, so that an HVAC "On/Off" control 10 may again be deployed to facilitate selection. Finally, in addition to or in lieu of sensory input, it is appreciated that reconfiguration may be triggered by receiving information from voice recognition software, or a telematic (such as OnStar™), short range (such as key fob), V2V, V2I, or cellular communication system (not shown) communicatively coupled to the controller 22.

As shown in FIG. 3, for example, a piezoelectric (or EAP) element 42 may be positioned on or within the engaging surface of the component 12, so as to convert a pressure input into a signal when the user engages the component 12. The piezoelectric element 42 may comprise the actuator element 18, such as wherein a piezoelectric patch is provided to form superjacent layers with the members 26 (FIG. 2a), or may be a stand-alone external sensor (FIGS. 2, 3). With respect to the latter, it is further appreciated that the piezoelectric element 42 and controller 22 may be further configured to convey a vibratory-tactile communication, and more preferably, one of a plurality of communications (e.g., throbbing, pulsating, low-frequency vibration, high-frequency vibration, etc.) back to the user as feedback. Whether intrinsic or external, the preferred sensory input is operable to distinguish between light taps/touches and strong hits/presses, so as to enable fine/coarse control of a function (e.g., a light tap may be configured to change the radio by 0.1 MHz, whereas a hit changes it by 1.0 MHz).

In another aspect of the invention, at least a portion of a plurality of controls 10 may be caused to shift in unison, so as to present a reconfigurable display or array 44. Here, the controls 10 are preferably connected to the source 20 in parallel and coordinated by the controller 22, such that differing sets may be activated and deactivated resulting in the display 44 being able to achieve a variety of patterns. Based on program logic, the sets may overlap. In the most diverse form, each set consists of a single control 10, such that the controls 10 are individually shiftable (FIG. 1). In this way, a user can be presented with different button layouts depending on the current operating mode, such that only the relevant controls 10 are presented. As such, user preference settings are preferably provided, such that the user is able to select which controls are deployed. Predetermined sets may be autonomously deployed upon the determination of a condition; for example, all radio control buttons may be presented upon activating the radio "On" control 10. Deployment of sets may be chronologically performed and coordinated, so as to cooperatively produce a predetermined effect. For example, by varying the scale and arrangement, animated patterns, such as pixilated logos or undulating "waves", can be created.

Lastly, it is appreciated that the controls 10 in certain configurations (e.g., push buttons, etc.) may be covered by an elastic membrane 46 (FIGS. 1, 2) that defines an exterior surface, so as to form a seal that prevents the infiltration of dirt and fluids that may physically jam/lock the control 10 and prevent movement/deployment. The membrane 46 may be integrated with an adjacent surface, such as the instrument panel of a vehicle, and can be flush mounted, or relieved. The membrane material is facilely conformal such that it is caused to stretch by the deployment force of the actuator 16, and presents a negligible bias that does not affect the function of the control 10. The membrane 46 is formed of durable material suitable to withstand repeated deformations and may be translucent where button lighting is provided. Where electric potential or thermal energy is used to activate the element 18, it is preferable that the membrane 46 further serve as an insulative layer to protect the user.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. An active interface control adapted for use by a user, selectively shiftable between, and presenting a selected one of first and second stable configurations, said control comprising:
    a manipulable component configured to facilitate manual engagement by the user; and
    an actuator further comprising
        at least one active material element operable to undergo a reversible change in functional dimension when exposed to or occluded from an activation signal, wherein the element is drivenly coupled to the component, such that the change causes the component to displace; and
        a bi-stable mechanism intermediate the component and element, driven by said at least one element, drivenly coupled to the component, and operable to magnify the displacement of the component, so as to result in an actuator stroke length greater than the change in dimension,
    wherein the element and mechanism are cooperatively configured to cause the control to shift to the other of said stable configurations, so as to further facilitate manual engagement by the user,
    wherein the mechanism includes at least one rigidly bent member defining anchored end points, presenting a bowed concave profile in the first configuration, and a bowed convex profile in the second configuration, so as to define a center-line of flexure.

2. The control as claimed in claim 1, wherein a plurality of members are laterally spaced by at least one spacer including distal spacers at the points, and a floating spacer intermediate the distal spacers.

3. The control as claimed in claim 2, wherein said at least one element includes first and second shape memory wires, the wires are distally connected to the distal spacers or end points and intermediately connected to the floating spacer, the first wire engages the floating spacer closer to the center-line of flexure than does the second wire when the control is in the second configuration, and the wires are cooperatively configured such that the first wire is taut and the second wire is slack when the members are in the first configuration, and the first wire is slack and the second wire is taut when the members are in the second configuration.

4. The control as claimed in claim 3, wherein the first wire engages the distal spacers below the second wire.

5. The control as claimed in claim 1, wherein said at least one element includes a shape memory wire presenting a diameter, the member presents a stiffness (k) along the vertical axis, and the diameter and stiffness are cooperatively configured.

6. The control as claimed in claim 1, wherein at least one of the points is selectively adjustable, so as to be laterally repositioned.

7. The control as claimed in claim 6, wherein the mechanism further includes an auxiliary actuator drivenly coupled to said at least one of the points.

8. The control as claimed in claim 1, wherein the element is formed of an active material selected from the group consisting essentially of a shape memory alloy (SMA), electroactive polymer (EAP), piezoceramic bimorph, piezoceramic unimorph, magnetorheological (MR) polymer, and electrorheological (ER) polymer.

9. The control as claimed in claim 1, wherein the control is visible only in the first configuration.

10. The control as claimed in claim 1, wherein said at least one element includes a plurality of thermally activated elements having differing transition temperatures, so as to be passively stowed or deployed.

11. An active interface control adapted for use by a user, selectively shiftable between, and presenting a selected one of first and second stable configurations, said control comprising:
a manipulable component configured to facilitate manual engagement by the user; and
an actuator further comprising
at least one active material element operable to undergo a reversible change in functional dimension when exposed to or occluded from an activation signal, wherein the element is drivenly coupled to the component, such that the change causes the component to displace; and
a bi-stable mechanism intermediate the component and element, driven by said at least one element, drivenly coupled to the component, and operable to magnify the displacement of the component, so as to result in an actuator stroke length greater than the change in dimension,
wherein the element and mechanism are cooperatively configured to cause the control to shift to the other of said stable configurations, so as to further facilitate manual engagement by the user,
wherein said at least one element includes first and second wires, and the wires are drivenly coupled to the mechanism non-antagonistically and operable to cause the control to shift to the first and second configurations, respectively.

12. A display comprising:
a plurality of interface controls selectively shiftable between first and second stable configurations, and defining a plurality of separately shiftable sets,
wherein each control further comprises:
a manipulable component;
at least one shape memory wire operable to undergo a reversible change in functional dimension when exposed to or occluded from an activation signal, and drivenly coupled to the component, so as to cause the component to displace as a result of the change; and
a bi-stable mechanism intermediately coupled to the wire and component, and operable to magnify the displacement of the component, so as to produce an actuator stroke greater than the change in functional dimension,
wherein the mechanism includes at least one rigidly bent member defining anchored end points, presenting a bowed concave profile in the first configuration, and a bowed convex profile in the second configuration, so as to define a center-line of flexure.

13. The display as claimed in claim 12, wherein each set consists of a single control, such that the controls are individually shiftable.

14. The display as claimed in claim 12, further comprising a controller communicatively coupled to the controls, wherein each set is further configured so as to be autonomously shifted in response to a predetermined condition or to produce a predetermined effect.

15. The display as claimed in claim 12, further comprising:
a power supply communicatively coupled to the controls, wherein the controls are connected to the supply in parallel, so as to be individually controlled.

16. An active interface control selectively shiftable between, and presenting a selected one of, deployed and stowed configurations, said control comprising:
a manipulable component;
an actuator including at least one active material element operable to undergo a reversible change in functional dimension when exposed to or occluded from an activation signal, and drivenly coupled to the component, such that the change causes the component to displace and the control to shift to a non-selected one of the configurations;
a bi-stable mechanism intermediate the component and element, drivenly coupled to the element, and operable to magnify the displacement of the component, so as to result in an actuator stroke length greater than the change in dimension; and
a controller communicatively coupled to, and configured to receive an input from the element,
wherein said at least one element and controller are cooperatively configured to determine a relevant or triggering condition based on the input, and cause the element to undergo the change only when determining the condition,
wherein the mechanism includes at least one rigidly bent member defining anchored end points, presenting a bowed concave profile in the first configuration, and a bowed convex profile in the second configuration, so as to define a center-line of flexure.

17. The control as claimed in claim 16, wherein the control is an active push button, the triggering condition is a pressure applied upon the component, and the pressure is insufficient to cause the button to achieve one of the configurations by itself.

18. The control as claimed in claim 17, wherein said at least one element includes a shape memory alloy wire, a sensing current is maintained within the wire, the controller is configured to detect a change in resistance within the wire, and the pressure is determined based on the change in resistance.

19. The control as claimed in claim 17, wherein said at least one element includes a piezoelectric or EAP element positioned and configured to receive a pressure input when a user engages the component.

20. The control as claimed in claim 19, wherein the piezoelectric or EAP element and controller are further configured to convey a vibratory-tactile communication back to the user.

* * * * *